3,002,837
ANTI-HALATION LAYERS AND FILTER-LAYERS FOR PHOTOGRAPHIC LIGHT SENSITIVE MATERIALS
Lothar Burgardt, Leverkusen-Bayerwerk, and Ottmar Wahl, Opladen, Germany, assignors to Agfa Aktiengesellschaft, a corporation of Germany
No Drawing. Filed Dec. 27, 1956, Ser. No. 630,763
Claims priority, application Germany Jan. 11, 1956
9 Claims. (Cl. 96—84)

The present invention relates to improvements in anti-halation and filter layers for photographic materials, especially light-sensitive materials.

It is usual to apply gelatine layers as non-curling layers to the back of roll film and flat film materials and to dye these layers to exclude halation otherwise caused by reflection of that radiation which is not absorbed by the light-sensitive layers. Furthermore, it is frequently necessary to arrange a dyed colloidal layer of predetermined spectral selectivity above one or more light-sensitive layers in order that the layers disposed therebeneath may be protected against the action of light or predetermined regions of the spectrum. For example, this is true of the well known yellow filter layer in the three layer assembly of color materials which utilize the subtractive color process.

For coloring such anti-halation and filter layers, it is known to use dyestuffs, advantageously acid dyestuffs owing to their photographic inertness. Such dyestuffs, to be suitable for practical use, must meet a very large number of conditions. As well as having a suitable spectral absorption, which must be broad for antihalation dyestuffs and as narrow as possible for filter dyestuffs, the dyestuffs must be readily soluble and should also not flocculate in high concentration in the colloid. They should be stable in the colloid layers, even under unfavourable conditions, but on the other hand should bleach out completely and irreversibly in the photographic baths. Another important condition for such dyes if they are to be useful in practice is their firm attachment in the layer associated therewith, that is to say, in rolled film material the dyes should not migrate under the influence of atmospheric humidity from the non-curling layer to the emulsion layer which is in contact therewith, nor should the dyes diffuse from the filter layers into the adjoining layers of the layer assembly.

A large number of dyestuffs and classes of dyestuff are known for the purpose in question, and these fulfill the conditions set forth to a greater or lesser degree. For example, styryl dyestuffs have been described which are obtained by the condensation of 1,3-disubstituted 5-pyrazolones, or cyanacetone benzenes substituted in the aryl nucleus, with p-N-dialkylamine benzaldehydes. The resistance to diffusion of these dyestuffs is for example achieved by introducing long aliphatic chains into the dyestuff molecule, it being possible for the long-chain aliphatic radical to be situated in the aldehyde component or in the component containing the active methylene group. However, experience shows that the ability of such dyestuffs provided with long aliphatic chains to bleach out irreversibly is appreciably impaired, and for this reason additional baths have been proposed which contains for example hydrazine or amines for completing the bleaching of such layers.

The firm attachment of the said styryl dyes in the associated layer can also be obtained by heterogeneously incorporating the dyes into the swellable colloid by passing the dye dissolved in a suitable plasticizer, together with the colloid through a colloid mill. Another method of heterogeneously incorporating such dyes is based on their precipitation as sparingly soluble salts in the colloid. These processes therefore also involve an undesirable complication.

It has now been found that styryl dyestuffs which are obtained by the condensation of compounds containing reactive methylene groups with aldehydes derived from diarylamines, preferably diphenylamines possess, in addition to the other said properties, a very firm attachment in gelatine or other film forming colloids without any of the above-described manipulations being necessary.

The arylamines can carry one or two aldehyde groups, preferably in the para-position to the nitrogen atom, so that the dyestuffs obtained have the following general formulae:

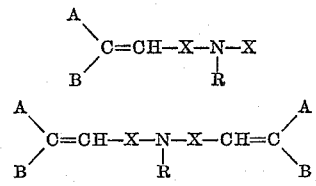

wherein A and B are organic groups which activate the methylene group and which may, together with the adjacent carbon atom, form an isocyclic or heterocyclic ring, or A can be a hydrogen atom and B a quaternary heterocyclic nitrogen base, X is an aromatic ring and R is a hydrogen atom or an alkyl or substituted alkyl group, such as methyl, ethyl, propyl, butyl. A and B may for instance stand for CN or COX, where X is aryl, such as phenyl, substituted aryl, such as phenyl substituted by alkyl, alkoxy, halogen, OR', R'.N.R', NH.R', R' being alkyl, aryl, substituted aryl, such as phenyl or naphthyl which may be substituted by alkyl, alkoxy, COOH, $SO_3H$ as halogen A stands preferably for CN and B for one of the other substituents. Suitable isocyclic or heterocyclic rings are for instance pyrazolone, isoxazolone, thiophene, coumarine, oxindole rings. As quaternary heterocyclic nitrogen bases there come into question, quaternary heterocyclic nitrogen bases as they are used for the production of cyanine dyestuffs as for instance thiazole-, benzthiazole-, naphthiazole-, oxazole-, benzoxazole-, naphthoxazole-, benzselenazole-, pyridine-, quinoline-, benzimidazole-, indolenine-bases which are quaternized and have an active methyl group in $\alpha$ or $\gamma$ position to the quaternized nitrogen atom. Of special interest are heterocyclic bases as they are disclosed in British specification 742,112. Said bases correspond to the formula

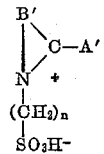

in which formula A' is an alkyl, such as methyl, B' together with the adjacent C atom and N atom represents a heterocyclic residue, as for instance pyridine, quinoline, thiazol, thiazoline, selen-azol, oxazol, benzthiazol, benzselenazol, benzoxazol, naphthiazol, naphthselenazol, naphthoxazol, indoline, pyrroline, thiodiazol, imidazol, benzimidazol, diazine or triazine. As regards the substituent X in the above general formulae this may be a benzene or naphthalene nucleus, which may be substituted by alkyl groups, such as methyl, ethyl, propyl, butyl, alkoxy groups, such as methoxy, ethoxy, propoxy, butoxy, halogen atoms, such as chlorine, bromine or other substituents.

The dyestuff molecules preferably contain at least one sulphonic acid group, which can be situated either in the component containing aldehyde groups or that containing methylene groups. It is also possible for both of the compounds used to build up the dyestuff molecule to contain one or more sulphonic acid groups or other solubilizing groups such as carboxyl groups or hydroxy-groups. Of special interest are aldehydes of the general formula

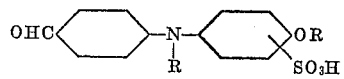

in which R stands for an alkyl group such as methyl, ethyl, propyl, butyl.

The said aldehydes are readily available by the known method of Vilsmeier and Haack (Ber. 60, 119), for example by reacting suitable N-alkyl diphenylamines with phosphorus oxychloride and secondary formylated aliphatic or aromatic amines, the reaction being carried out with or without a solvent, but preferably without a solvent, at temperatures of 20 to 80° C. They are readily obtained in pure form by distillation or by dissolving in and crystallizing from organic solvents, preferably methanol or ethanol. The two aryl nuclei offer sufficient possibilities of introducing further substituents, which is either effected before the formylation according to Vilsmeier or subsequently, as for example by sulphonation. p-N-phenylaminobenzaldehyde can for example be prepared by the process described in Friedlander 5, 101–109.

Examples of suitable diphenylamine aldehydes are:

p-(N-ethyl-N-phenylamino)-benzaldehyde,
p-(N-methyl-N-p'-methoxyphenylamine)-benzaldehyde,
p - (N-methyl-N-p'-methoxy-m'-sulfophenylamino)-benzaldehyde,
p-(N-methyl-N-p'-ethoxyphenylamino)-benzaldehyde,
p-(N-methyl-N-p'-tolylamino)-benzaldehyde,
p - (N-methyl-Np'-ethoxy-m'-sulphophenylamino)-benzaldehyde,
p,p-Diformyl-N-ethyl diphenylamine,
p,p'-Diformyl-N-methyl diphenylamine,
p,p'-Diformyl diphenylamine-N-acetic acid,
p-N-phenylamino benzaldehyde.

The following substances are examples of compounds which have an active methylene group which are suitable for the production of the dyestuffs referred to:

3-alkyl-5-pyrazolones preferably substituted in the 1-position by unsubstituted aryl nuclei, substituted aryl nuclei or heterocyclic rings;
1-aryl-5-pyrazolone-3-carboxylic acids, their amides, esters etc.;
3-aryl isoxazolones and 3-aryl-5-pyrazolones;
Cyanacetoaryl compounds, the aryl nuclei of which can carry various substituents;
Cyanacetamide and substituted cyanacetanilide compounds;
Malodinitrile, malonic esters and malonic amides;
Acetoacetanilide or benzoyl acetanilide and corresponding derivatives;
3-hydroxythiophenes;
4-hydroxycumarins;
Oxindoles;
2-methyl benzthiazole-N-butane sulphonic acid;
2-methylene-1,3'-trimethylindolenine;
N-alkyl-α(or γ)-methyl pyridinium and quinolinium bases.

Depending on the selection of the last mentioned component, it is possible for the spectral properties of the dyestuffs to be influenced to a very high degree. For example, yellow dyestuffs are given by cyanacetoaryl compounds, orange-colored dyestuffs by 3-alkyl pyrazolones, orange-red to red dyestuffs by 3-carboxypyrazolones and bluish-red dyestuffs by onium compounds such as 2-methyl benzthiazole-N-butane sulphonic acid.

The dyes are produced by heating the components for several hours in methanol or ethanol in the presence of basic condensation agents, advantageously pyridine. The dyes are obtained in crystalline form or are precipitated out with a sodium chloride solution. By crystallization from, or evaporation of, hydrophilic organic solvents, they are obtained in pure form. The acid dyestuffs are usually so readily soluble in water that it is not necessary to convert them into the alkali metal salts. The dyestuffs are dissolved in water and stirred into the gelatine solution or an aqueous solution of another conventional colloid. The solutions are cast in the usual manner on to the back of a support or applied between or above silver halide layers.

In order to produce antihalation layers which absorb over wide portions of the spectrum, several dyestuffs of the present invention can also be used in admixture with each other. Furthermore, the dyestuffs of the present invention can be used in admixture with dyestuffs as described in British specificaion No. 760,739, or, in accordance with our copending application Serial No. 591,804, filed June 18, 1956, corresponding to Belgian patent specification 548,978, with known red or green basic dyestuffs which are non-resistant to alkaline silver halide developing solution containing sulphite and which are fixed by them in gelatine. In addition, the dyestuffs can also be added as optical desensitizers to layers containing silver halide.

EXAMPLE 1

8.1 g. of 3-phenylisoxazolone (J. Am. Chem. Soc. 35, 960) and 18 g. of p-(N-methyl-N-p'-ethoxy-m-sulphophenylamino)-benzaldehyde are heated under reflux for 3 hours in 100 cc. of ethanol with 10 cc. of pyridine. The mixture is filtered with suction after cooling and the dyestuff is extracted by boiling with ethanol.

p-(N-methyl-N-p'-ethoxy-phenylamin) - benzaldehyde (M.P. 121–123° C.) is prepared in accordance with the data given in Ber. 60, 121 or German specification No. 706,937 (see also Houben Meth. d. Org. Chem. 4th edition, volume VII/1, p. 32). The sulphonic acid group is introduced as follows: 35 g. of the aldehyde are introduced with stirring and cooling at 20–25° C. into a mixture of 90 cc. of sulphuric acid monohydrate and 30 cc. of 20% oleum. The mixture is stirred for two hours, poured on to ice and caused to crystallize by trituration. The resulting mixture is quickly filtered with suction and the residue is dissolved in 600 cc. of water; the resulting solution is clarified with active carbon and filtered, and 60 g. of solid sodium chloride are added to the filtrate. On cooling, the dyestuff is formed as lustrous flakes. After filtration with suction and drying it is dissolved in and recrystallised from alcohol.

5 parts of the dyestuff obtained (Formula I of the table at the end of this specification) are dissolved in 500 cc. of water and stirred into 500 parts of a 10% gelatine solution at 35° C. This solution is applied as a non-curling layer to the back of a support which is provided with a blue-sensitive silver halide layer. The backing layer is orange-coloured and absorbs light of the wavelengths 400–550 mμ.

This material is exposed to light and developed in a developer of the following composition:

| | |
|---|---|
| Water _____ cc__ | 1000 |
| p-Methylaminophenol _____ g__ | 5 |
| Hydroquinone _____ g__ | 6 |
| Anhydrous sulphite _____ g__ | 40 |
| Potassium carbonate _____ g__ | 40 |
| Potassium bromide _____ g__ | 2 |

After being fixed, the film is washed. The backing layer is now entirely colourless. The material referred to above only yields insignificant amounts of dyestuff when washed for 1 hour.

EXAMPLE 2

8.8 g. of p-methoxycyanacetobenzene (Ber. 30, 1715; M.P. 126–128) and 18 g. of p-(N-methyl-N-p'-ethoxy-m'-sulphophenylamino)-benzaldehyde are reacted in ethanol in the presence of pyridine as in Example 1 to form the styryl dyestuff. For purification purposes, the dyestuff is dissolved in and recrystallised from ethanol.

5 parts of this dyestuff (Formula II of the table) are dissolved in gelatine instead of dyestuff (I) as in Example 1 and applied. A yellow backing layer is obtained which does not yield any dyestuff on washing, but is bleached after being developed, fixed and washed.

EXAMPLE 3

8.5 g. of 2-methylbenzthiazole-N-butane sulphonic acid-betain and 11 g. of p-(N-methyl-N-p'-ethoxy-m'-sulphophenylamino)-benzaldehyde are heated under reflux for 6 hours in 60 cc. of ethanol with 3 cc. of triethylamine. On cooling, the dyestuff (III) crystallises out and this is dissolved in and recrystallised from ethanol. The dyestuff condensation can also be carried out in glacial acetic acid in the presence of pyridine. The dyestuff is precipitated in metallic lustrous flakes with sodium chloride solution.

5 parts of this dyestuff (III) are dissolved in 300 parts of hot water and incorporated by stirring into 500 parts of a 10% aqueous gelatine solution. 2 parts of the dyestuff IV (produced from 13.6 g. of 3-methyl-1-(6'-sulpho-β-naphthyl)-pyrazolone and 18 g. of p-(N-methyl-p'-ethoxy-m'-sulphophenylamino) - benzaldehyde as described in Example 1) dissolved in 200 parts of water are then added to the gelatine solution, which is bluish-red in colour. The solution is applied to the back of a transparent support the front of which is provided with an orthochromatically sensitised silver halide emulsion. The backing layer is red and absorbs light of the wavelengths 400–600 mμ. The layer does not bleed out any dye in running water, and, after the conventional photographic treatment, the backing layer is bleached.

EXAMPLE 4

30 g. of 1-(p'-sulpho-o'-chlorophenyl)-3-methyl pyrazolone and 12.7 g. of p,p'-diformyl-N-ethyl diphenylamine are condensed in the usual manner in 120 cc. of ethanol with 15 cc. of pyridine.

The dyestuff is purified by boiling with acetone.

p,p'-Diformyl-N-ethyl diphenylamine is produced as follows:

240 g. of phosphorus oxychloride and 150 g. of dimethyl formamide are mixed while cooling. After 1 hour, 100 g. of N-ethyl diphenylamine are added dropwise to the mixture while stirring, stirring as continued for 5 hours at 80° C. and the mixture is introduced at 40° C. into water to which 100 cc. of hydrochloric acid have been added. The mixture is stirred until the oil has become solid whereupon it is filtered with suction and the aldehyde is dissolved in and recrystallised twice from ethanol. M.P. =73–74° C. Yield: 95 g.

8 parts of this dyestuff (V) are dissolved in 500 parts of water and introduced with stirring into 500 parts of a 12% gelatine solution. A backing layer coated therewith is orange-red and absorbs light of the wavelengths 400–570 mμ. After the usual treatment, the backing layer is colourless.

EXAMPLE 5

15 g. of 1-(p'-sulpho-o'-methylphenyl)-pyrazolone-3-carboxylic acid and 12.7 g. of p-(N-methyl-N-p'-ethoxyphenylamino)-benzaldehyde are heated for 2 hours under reflux in 100 cc. of methanol with 1 cc. of piperidine. The red dyestuff is purified by dissolving in and crystallising from ethanol.

5.5 parts of this dyestuff (VI), dissolved in 200 parts of water, are added to 500 parts of 10% gelatine solution. 4 parts of the dyestuff (see German specification No. 932,343) of the formula

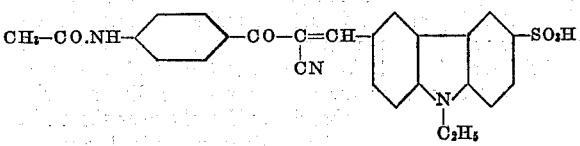

are then dissolved in 300 parts of water and stirred into the gelatine solution, which is deep red in colour. A layer cast therewith absorbs light from 580 mμ to far into the ultraviolet range. The dyestuffs do not bleed out on being washed and the layer is bleached on development.

EXAMPLE 6

12.7 g. of 2-cyanacetamino naphthalene-6-carboxylic acid (obtained by reacting 1 mol of β-naphthylamine-6-carboxylic acid with 1 mol of cyanacetic ester in pyridine) and 17 g. of p-(N-methyl-N-p'-ethoxy-m'-sulphophenylamino)-benzaldehyde are heated for 5 hours under reflux in 200 cc. of ethanol and 15 cc. of pyridine. The dyestuff is filtered off with suction and converted in the usual manner into its sodium salt.

4 parts of the dyestuff (VII) are dissolved in water and added to the gelatine solution. A layer prepared therewith has an absorbing action in the blue and long-wave ultraviolet ranges of the spectrum. After development with developers containing a sulphite, the layer is bleached.

EXAMPLE 7

8.6 g. of 3,4-dimethyl-cyanacetobenzene (M.P.= 107–109° C.) and 18 g. of p-(N-methyl-N-p'-ethoxy-m'-sulphophenylamino)-benzaldehyde are heated for 3 hours after reflux in 120 cc. of ethanol with 10 cc. of pyridine. After cooling, the dyestuff is filtered off with suction and disoslved in and crystallised from alcohol.

3,4-dimethyl cyanacetobenzene is converted by the process indicated in Ber. 30, 578 into the corresponding chloroacetyl compound and this is converted by means of potassium cyanide into the cyanaceto compound.

4 parts of this dyestuff (VIII) are dissolved in 200 parts of water and incorporated by stirring into 800 parts of a 6% gelatine solution. This solution is used for the production of a filter layer in a multi-layer material to be processed by colour development. For this purpose, a suitable support has arranged thereon a green-sensitive silver halide layer with magenta component, above which is a red-sensitive silver halide with a cyan component and on the latter there is applied the yellow filter layer. This filter layer serves to filter out the blue light. It can be coated with an unsensitised silver halide layer with yellow component. The material is exposed to light and developed in a developer having the following composition:

|                                       | Grams |
|---------------------------------------|-------|
| Diethyl-p-phenylene diamine sulphate  | 3     |
| Sulphite                              | 2     |
| Anhydrous sodium carbonate            | 60    |
| Potassium bromide                     | 2     |
| Water up to 1000 cc.                  |       |

After brief washing, it is bleached in the usual manner, fixed and rinsed. After this treatment, the filter layer has been irreversibly bleached.

EXAMPLE 8

28.5 g. of 1-(p'-sulphophenyl)-pyrazolone-3-carboxylic acid and 12.7 g. of p,p'-diformyl-N-ethyl diphenylamine are heated under reflux for 3 hours in 200 cc. of methanol and for a further 2 hours after the addition of 15 cc. of pyridine.

The solution is filtered and the filtrate stirred into ethanol, and the dyestuff thus precipitated is filtered off with suction.

4 parts of this dyestuff (IX) are dissolved in 200 parts of water and added to 600 parts of a 10% gelatine solution. A solution of 1.5 parts of malachite green in 200 parts of water is then stirred into the gelatine solution and the resulting solution is used in the usual manner as an antihalation layer for a panchromatic film material. The layer is grey and absorbs uniformly over the entire visible spectrum. The layer does not bleed out any dyestuff in running water; after being developed, fixed and washed, the layer is colourless and transparent.

EXAMPLE 9

11.5 g. of N-methyl-p,p'-diformyldiphenylamine and 31.4 g. of 1-(2'-hydroxy-3'-carboxy-5'-sulphophenyl)-3-methyl-pyrazolone are condensed in the usual manner in 200 cc. of ethanol with 5 cc. of pyridine. The dyestuff is boiled with ethanol. The N-methyl-p,p'-diformyl diphenylamine is prepared according to the data indicated for the corresponding N-ethyl compound (see Example 4). M.P.=89–90° C.

The dyestuff obtained (X) is orange in colour and can be used as indicated in Example 1 for dyeing a non-curling layer.

EXAMPLE 10

13.3 g. of 4,5,7-trihydroxy coumarin-6-(or 8)-carboxylic acid ethyl ester (B. 31, 2015; Soc. 75, 810) and 18 g. of p-(N-methyl-N-p'-ethoxy-m'-sulphophenyl)-aminobenzaldehyde are condensed in the usual manner in ethanol and the dyestuff thereby being formed is boiled with ethanol.

The dyestuff (XI) is poured in the usual manner as a sodium salt into gelatine and yields a bluish-red layer.

EXAMPLE 11

15.7 g. of 1-(2'-hydroxy-3'-carboxy-5'-sulphophenyl)-3-methyl pyrazolone and 11.5 g. of N-ethyl-N-phenyl-aminobenzaldehyde (B.P., 8 mm. 145–148° C.) are condensed in the usual manner in ethanol in the presence of pyridine.

The dyestuff (XII) is yellow and can be used in accordance with the examples for any of the purposes mentioned therein.

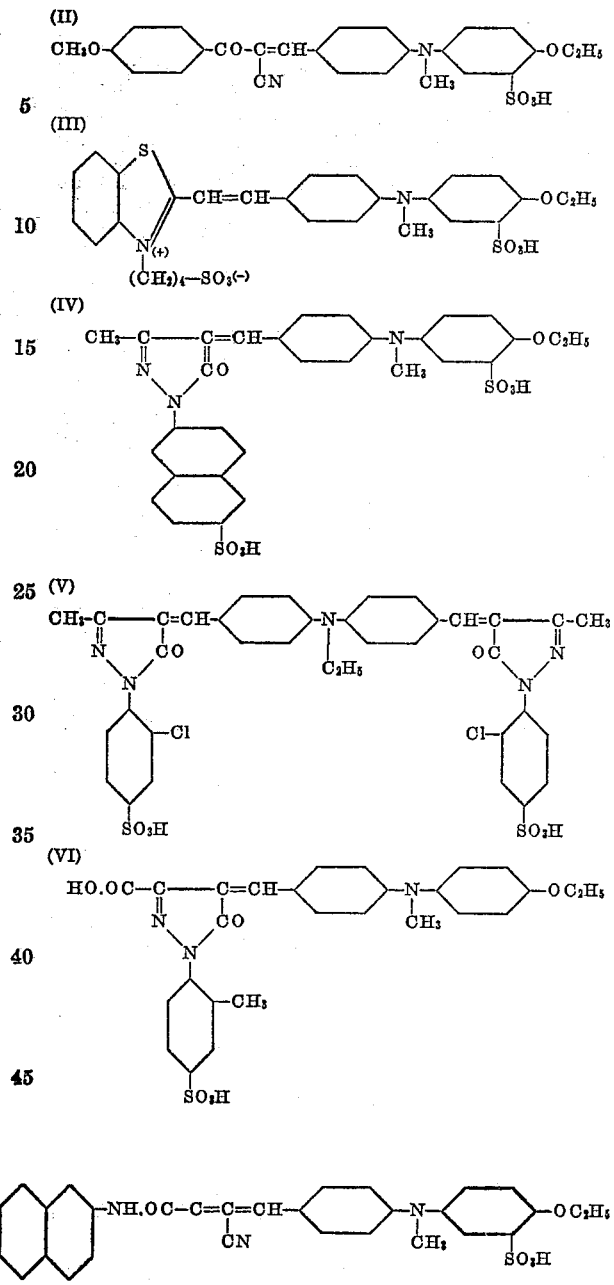

*Table of formulae*

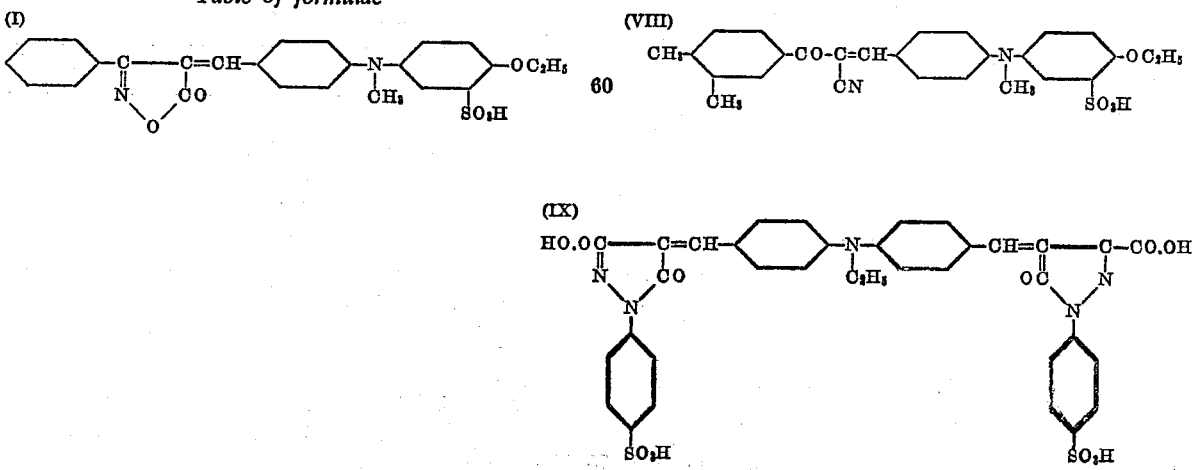

(X) 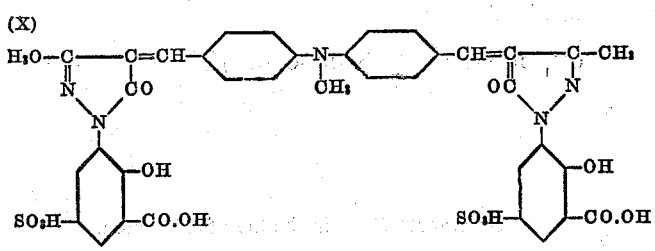

(XI) 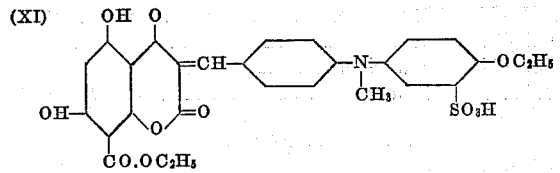

(XII) 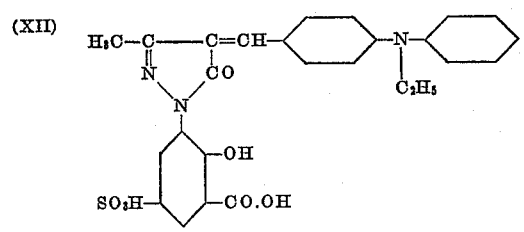

We claim:
1. A photographic material comprising a support and coated on said support a silver halide emulsion and an antihalation layer colored by a colored styryl compound having a formula selected from the class consisting of:

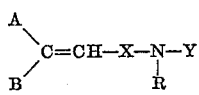

and

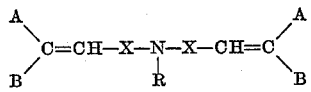

wherein A and B are selected from the class of radicals that activate the C to which they are attached, said class consisting of (1) —CN, (2) monovalent structures having a carbonyl group directly linking a radical to the C to which the A and B are attached, (3) radicals which with the C to which the A and B are linked form a ring which includes A and B and which is selected from the group consisting of pyrazolone, isoxazolone, thiophene, coumarine, and oxindole rings, and (4) quaternary thiazolyl, oxazolyl, selenazolyl, pyridinyl, pyrrolinyl, thiodiazolyl, diazinyl, triazinyl, imidazolyl and indoleninyl radicals in which quaternary radicals the quaternary nitrogen is in a position selected from the group consisting of alpha and gamma positions with respect to a carbon atom and said carbon atom is directly connected to the C that carries the A and B, one of A and B being hydrogen when the other is said quaternary radical, X is an arylene radical, Y is an aryl radical, said arylene and aryl radicals having up to 10 aryl carbon atoms and having substituents selected from the group consisting of hydrogen, alkyl, alkoxy and halogen, R is selected from the class consisting of hydrogen, alkyl and carboxy alkyl groups and the aliphatic carbon chains in said compound being no more than 4 carbons in length.

2. The combination of claim 1 wherein B is a member of said group 4 and further wherein the quaternized nitrogen atom is positioned alpha to a carbon atom and said carbon atom is directly connected to the C that carries the A.

3. The combination of claim 1 in which the styryl compound has the formula

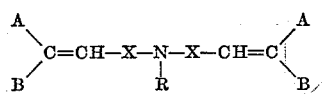

4. The combination of claim 1 wherein the styryl compound contains a sulphonic acid group.

5. The combination of claim 1 in which the styryl compound is

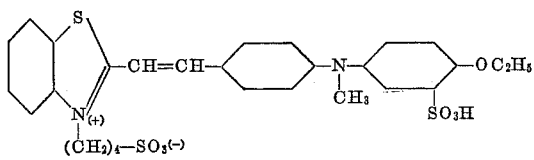

6. The combination of claim 1 in which the styryl compound is

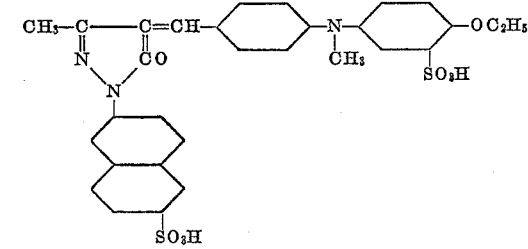

7. The combination of claim 1 in which the colored layer is an antihalation layer and it is colored by a mixture of

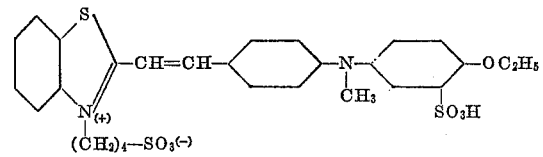

and

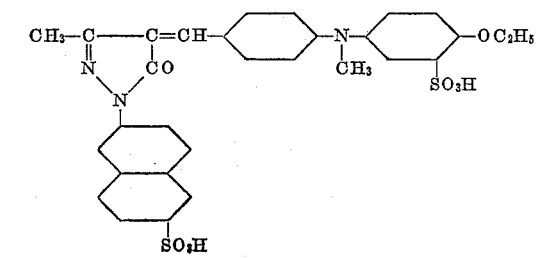

8. The combination of claim 1 in which the styryl compound is
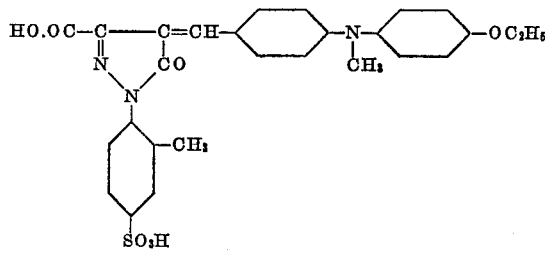
9. The combination of claim 1 in which the styryl compound is
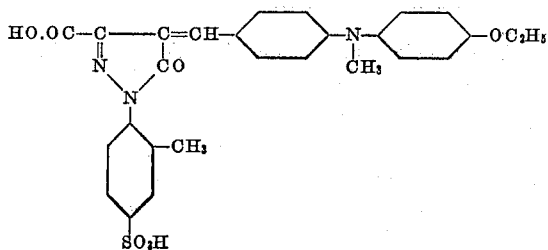
and is mixed with
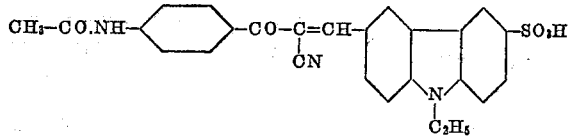
References Cited in the file of this patent
UNITED STATES PATENTS
| | | |
|---|---|---|
| 1,845,404 | Durr et al. | Feb. 16, 1932 |
| 2,043,081 | Wahl | June 2, 1936 |
| 2,186,731 | Schneider | Jan. 9, 1940 |
| 2,280,253 | Muller et al. | Apr. 21, 1942 |
FOREIGN PATENTS
| | | |
|---|---|---|
| 160,780 | Germany | Feb. 10, 1942 |

UNITED STATES PATENT OFFICE
Certificate of Correction

Patent No. 3,002,837                            October 3, 1961

Lothar Burgardt et al.

It is hereby certified that error appears in the above numbered patent requiring correction and that the said Letters Patent should read as corrected below.

Column 2, line 23, for "a re" read —are—; line 30, for "COX, where X" read —COX', where X'—; line 35, for "as" read —or—; column 3, line 39, for "p-(N-methyl-Np'-" read — p-(N-methyl-N-p'- —; column 6, line 3, extreme left-hand portion of the formula, for "CH$_3$-CO.NH-" read — CH$_3$-CONH- —; column 8, left-hand portion of formula (VI), for "HO.OC-" read — HOOC- —; same column 8, for that portion of the formula (VII) reading same column 8, extreme left-hand portion of formula (IX), for

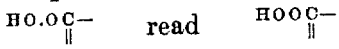

same column 8, extreme right-hand portion of the same formula, for "-CO.OH" read — -COOH —; column 9, formula (X) should appear as shown below instead of as in the patent:

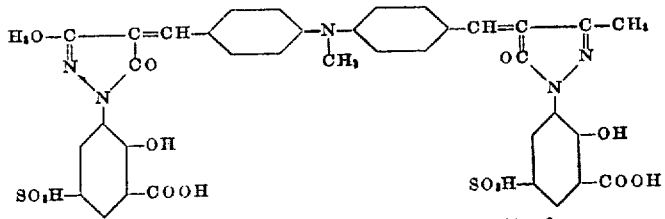

same column 9, the lower left-hand portion of formula (XI), for

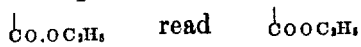

same column 9, the lower right-hand portion of formula (XII), for "-CO.OH" read — -COOH —; column 11, the extreme left-hand portion of the first and second formula, for "HO.OC-", each occurrence, read — HOOC- —; column 12, the extreme left-hand portion of the formula, for "CH$_3$-CO.NH-" read — CH$_3$-CONH- —.

Signed and sealed this 8th day of May 1962.

[SEAL]

Attest:
ERNEST W. SWIDER,
*Attesting Officer.*

DAVID L. LADD,
*Commissioner of Patents.*